United States Patent
Ishihara et al.

(10) Patent No.: US 7,707,900 B2
(45) Date of Patent: May 4, 2010

(54) TORQUE DETECTING DEVICE HAVING MAGNETIC SHIELD FOR SHIELDING MAGNETIC NOISE

(75) Inventors: Toshiharu Ishihara, Kashiba (JP); Taisuke Tsujimoto, Kashihara (JP); Naoki Nakane, Toyota (JP)

(73) Assignees: JTEKT Corporation, Osaka (JP); DENSO Corporation, Aichi (JP)

( * ) Notice: Subject to any disclaimer, the term of this patent is extended or adjusted under 35 U.S.C. 154(b) by 52 days.

(21) Appl. No.: 12/083,663

(22) PCT Filed: Oct. 27, 2006

(86) PCT No.: PCT/JP2006/321503
§ 371 (c)(1),
(2), (4) Date: Apr. 16, 2008

(87) PCT Pub. No.: WO2007/049747
PCT Pub. Date: May 3, 2007

(65) Prior Publication Data
US 2009/0107259 A1   Apr. 30, 2009

(30) Foreign Application Priority Data
Oct. 28, 2005   (JP) .............................. 2005-315029

(51) Int. Cl.
*G01L 3/02* (2006.01)
(52) U.S. Cl. .............................. 73/862.193; 73/862.331
(58) Field of Classification Search ............ 73/862.193, 73/862.331–862.333
See application file for complete search history.

(56) References Cited

U.S. PATENT DOCUMENTS

| 5,083,359 | A  | * | 1/1992  | Aminder et al. ............ 29/602.1 |
| 6,341,535 | B1 | * | 1/2002  | Yasui ..................... 73/862.333 |
| 6,928,887 | B2 | * | 8/2005  | Nakane et al. ......... 73/862.331 |
| 7,013,741 | B2 | * | 3/2006  | Nakamura et al. ...... 73/862.333 |
| 7,051,602 | B2 | * | 5/2006  | Nakane et al. ......... 73/862.333 |
| 2001/0029791 | A1 | * | 10/2001 | Sezaki .................. 73/862.333 |
| 2004/0074316 | A1 |   | 4/2004  | Nakane et al. |
| 2004/0194559 | A1 |   | 10/2004 | Nakamura et al. |

FOREIGN PATENT DOCUMENTS

| JP | 2002-228526 A | 8/2002 |
| JP | 2004-125717 A | 4/2004 |
| JP | 2004-309184 A | 11/2004 |

* cited by examiner

*Primary Examiner*—Max Noori
(74) *Attorney, Agent, or Firm*—Birch, Stewart, Kolasch & Birch, LLP

(57) ABSTRACT

A magnetic shield made of magnetic material in the shape of a thin cylinder is externally fitted and fixed on a cylindrical mold member holding magnetic flux collecting rings so that it has extended sections with appropriate length on both sides in the axial direction, and therefore magnetic noise from outside in the radial direction is shielded directly by the outer surface of the magnetic shield, magnetic noise from both sides in the axial direction is shielded by concentrating the magnetic noise on the end faces of the magnetic shield, and the influence on the magnetic flux collecting rings held in the mold member is eliminated.

6 Claims, 6 Drawing Sheets

TORQUE DETECTING DEVICE HAVING MAGNETIC SHIELD FOR SHIELDING MAGNETIC NOISE

This application is the national phase under 35 U.S.C. §371 of PCT International Application No. PCT/JP2006/321503 which has an International filing date of Oct. 27, 2006 and designated the United States of America.

BACKGROUND

1. Technical Field

The present invention relates to a torque detecting device for detecting rotational torque applied to a rotary shaft, and more particularly relates to a torque detecting device that can be suitably used to detect steering torque in an electric power steering apparatus.

2. Description of Related Art

In an electric power steering apparatus which assists steering by driving a steering assist motor according to the rotation operation of a steering member, such as a steering wheel, and applying rotational force of the motor to a steering mechanism, it is necessary to detect the steering torque applied to the steering member for use in the drive control of the steering assist motor. For this detection, in the prior art, the electric power steering apparatus uses a torque detecting device which is mounted in the middle of a steering shaft connecting the steering member and the steering mechanism together.

In this torque detecting device, the steering shaft (rotary shaft), which is an object of detection, is divided into a first shaft located on the steering member side and a second shaft located on the steering mechanism side, the first and second shafts are connected coaxially with a small-diameter torsion bar as a torsion spring, and the steering torque (rotational torque) applied to the steering shaft by the rotation operation of the steering member is detected on the basis of a relative angular displacement caused between the first and second shafts with the torsion of the torsion bar.

For the means for detecting the relative angular displacement between the first and second shafts, various kinds of structures have been conventionally proposed. As one example, there is a torque detecting device comprising a cylindrical magnet which rotates together with one of the first and second shafts; a yoke ring which rotates together with the other; and detecting means which uses a change in a magnetic circuit formed between the cylindrical magnet and the yoke ring (see, for example, Japanese Patent Application Laid-Open No. 2004-125717).

In the yoke ring, a plurality of pole claws extending in the axial direction are arranged at equal intervals in the circumferential direction on one side of a ring-shaped yoke body, and a pair of ring-shaped yoke bodies with their pole claws being arranged alternately in the circumferential direction are fixed to the first shaft or the second shaft. The cylindrical magnet is a multi-polar magnet including the same number of pairs of magnetic poles as the pole claws of the yoke rings arranged in the circumferential direction, and positioned and fixed to the second shaft or the first shaft so that, when the cylindrical magnet is in a neutral state in which there is no relative angular displacement between the first and second shafts, the pole claws of the yoke rings are aligned on the boundaries between the N and S poles.

On the outside of the two yoke rings, magnetic flux collecting rings for collecting the magnetic flux generated in these yoke rings are placed closely to face the yoke bodies, respectively. These magnetic flux collecting rings have magnetic flux collecting sections extending in the axial direction from the magnetic flux collecting rings, at positions aligned in the circumferential direction, and a magnetic sensor composed of a magnetic detection element such as a Hall element is placed between these magnetic flux collecting sections opposing each other with a predetermined air gap therebetween. With a mold member formed in a cylindrical shape to cover the outside of the magnetic flux collecting rings, the magnetic flux collecting rings and magnetic sensor described above are integrated while maintaining their positional relationship, and fixed to a housing supporting the steering shaft through the mold member.

In this structure, when steering torque is applied to the steering shaft and a relative angular displacement is caused between the first and second shafts, the positional relationship in the circumferential direction between the pole claws of the two yoke rings and the magnetic poles of the cylindrical magnet changes in mutually opposite direction, and the leakage flux in the air gap between the magnetic flux collecting sections of the magnetic flux collecting rings is increased or decreased by the change of magnetic flux in the respective yoke rings corresponding to the positional change. By extracting a change in the output of the magnetic sensor corresponding to this increase or decrease, it is possible to detect the steering torque.

In the torque detecting device constructed as described above, when magnetic noise applied from outside are superimposed on the magnetic flux collected in the magnetic flux collecting rings, the output of the magnetic sensor suffers from the influence of the noise, and there is a possibility that the accuracy of detecting the steering torque is lowered. Thus, in the prior art, a magnetic shield for shielding magnetic noise is provided in the periphery of the magnetic flux collecting rings.

FIG. 1 is a cross sectional view showing the structure of a conventional magnetic shield disclosed in Japanese Patent Application Laid-Open No. 2004-125717. FIG. 1 shows a magnetic flux collecting ring assembly comprising a pair of magnetic flux collecting rings 6 and 6 and a magnetic sensor 7 which are integrated with a mold member 61 formed by molding a resin into a cylindrical shape. The magnetic flux collecting rings 6 and 6 are integrated so that they are separated from each other by a predetermined distance in the axial direction and exposed to the inner circumferential surface of the mold member 61. The magnetic flux collecting rings 6 and 6 have, at corresponding positions in the circumferential direction, magnetic flux collecting sections 60 and 60 extending toward each other in the axial direction, and the magnetic sensor 7 is positioned between the opposing surfaces of the ends of the magnetic flux collecting sections 60 and 60 which are bent outward in the radial direction.

As shown in FIG. 1, the magnetic shield 9 is a thin plate of magnetic material composed of an outer circumferential plate 9a for covering the outer circumferential surface of the mold member 61 and linked end-face plates 9b and 9b, which are formed by bending both sides of the outer circumferential plate 9a inward at substantially right angles for covering the end faces, is mounted to cover three surfaces (the outer circumferential surface and both end faces) except the inner circumferential surface of the mold member 61 in which the magnetic flux collecting rings 6 and 6 made of magnetic material are exposed, and performs the function of shielding magnetic noise coming from various directions as shown by the arrows in FIG. 1 and eliminating the influence on the magnetic flux collecting rings 6 and 6.

As disclosed in Japanese Patent Application Laid-Open No. 2004-125717, such a magnetic shield 9 is mounted by a procedure in which a belt-like plate having a U-shaped cross section consisting of the outer circumferential plate 9a and end-face plates 9b and 9b shown in FIG. 1 is wound around the outside of the mold member 61, cut at an appropriate position, and joined to the beginning end of the belt-like plate. During this mounting, however, a lot of power and work are required to bent and wind the belt-like plate having the U-shaped cross section and further work is required for joining after winding, and thus there is a problem that the product cost is increased by an increase in the number of assembly steps.

It is also possible to construct the outer circumferential plate 9a and the end-face plates 9b and 9b as separate rings and mount them by a procedure in which the outer circumferential plate 9a and the end-face plates 9b and 9b are positioned separately on the outside of the mold member 61 and then joined together. In this case, however, it is necessary to join the outer circumferential plate 9a and the end-face plates 9b and 9b over the entire circumference, and thus there is no effect of reducing the number of assembly steps.

SUMMARY

An object of the present invention is to provide a torque detecting device comprising a magnetic shield capable of being easily mounted while maintaining the magnetic noise shielding effect, and capable of reducing the number of assembly steps.

A torque detecting device according to a first aspect of the invention is a torque detecting device comprising: a cylindrical magnet rotating together with one of a first shaft and a second shaft which are coaxially connected to each other; a pair of yoke rings rotating together with the other one of the first shaft and second shaft within a magnetic field formed by the cylindrical magnet; a pair of magnetic flux collecting rings surrounding the outside of the yoke rings separately; and a magnetic sensor placed between opposing surfaces of magnetic flux collecting sections provided on the respective magnetic flux collecting rings, wherein the torque detecting device detects torque applied to the first shaft and second shaft, based on leakage magnetic flux between the magnetic flux collecting sections which is detected by the magnetic sensor, and is characterized by comprising a magnetic shield for covering the outside of a mold member holding the magnetic flux collecting rings integrally, the magnetic shield being made of magnetic material and having extended sections in an axial direction on both sides of the mold member.

A torque detecting device according to a second aspect of the invention is characterized in that the mold member and the magnetic shield of the first aspect are cylindrical members, and the magnetic shield is externally fitted and fixed on the mold member.

In the torque detecting device according to the first aspect of the invention, the outside of the mold member holding the magnetic flux collecting rings is covered with a simple-shaped magnetic shield having extended sections in the axial direction on both sides of the mold member. The magnetic shield is able to be mounted easily, shields directly magnetic noise from outside in the radial direction, and shields magnetic noise from both sides in the axial direction by concentrating the magnetic noise on the end faces of the extended sections on both sides. It is thus possible to eliminate the influence of magnetic noise on the magnetic flux collecting rings and achieve highly accurate detection of torque.

In the torque detecting device according to the second aspect of the invention, the magnetic shield in a cylindrical shape is externally fitted and fixed on the cylindrical mold member. Hence, it is possible to effectively shield magnetic noise by simply mounting the magnetic shield, and it is possible to achieve highly accurate detection of torque.

The above and further objects and features will more fully be apparent from the following detailed description with accompanying drawings.

DETAILED DESCRIPTION

The following description will explain the present invention in detail with reference to the drawings illustrating a preferred embodiment thereof.

Figure 2:
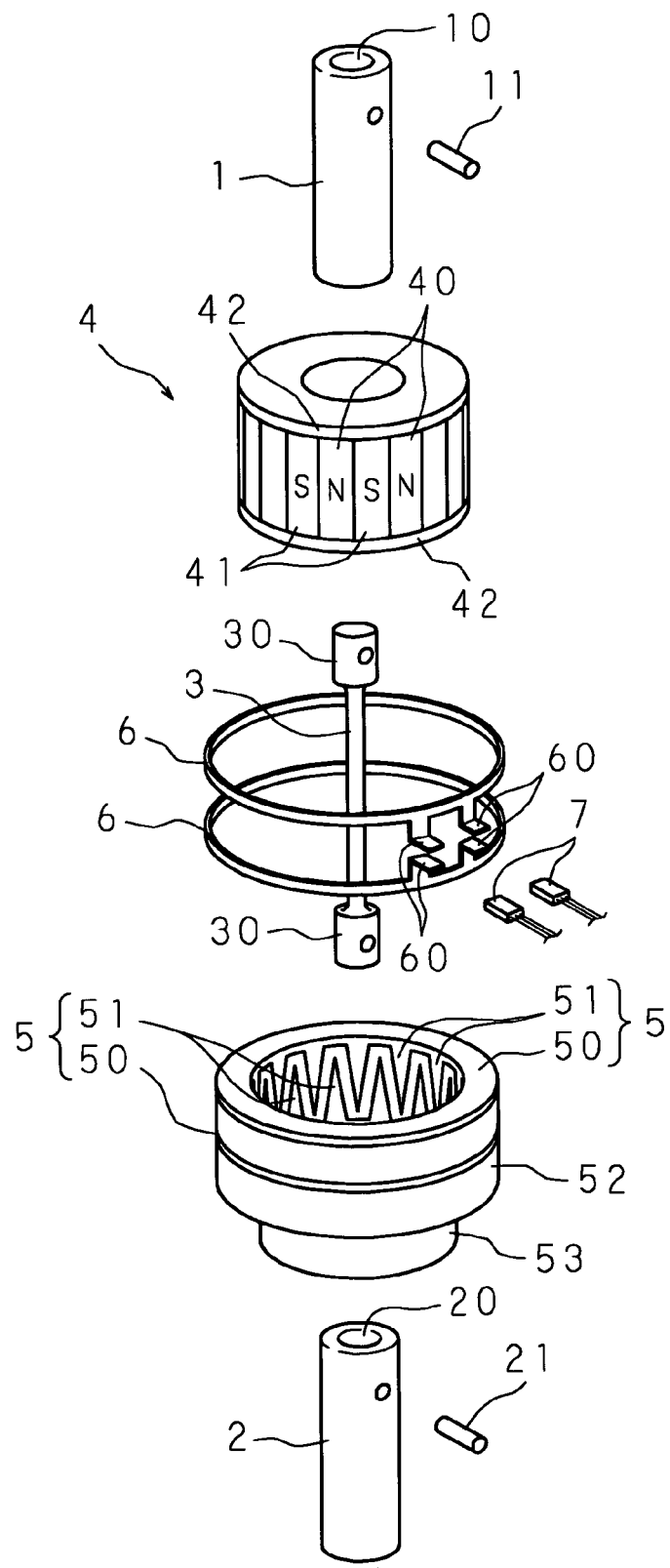
FIG. 2 is an exploded perspective view of a torque detecting device of the present invention.
Figure 3:
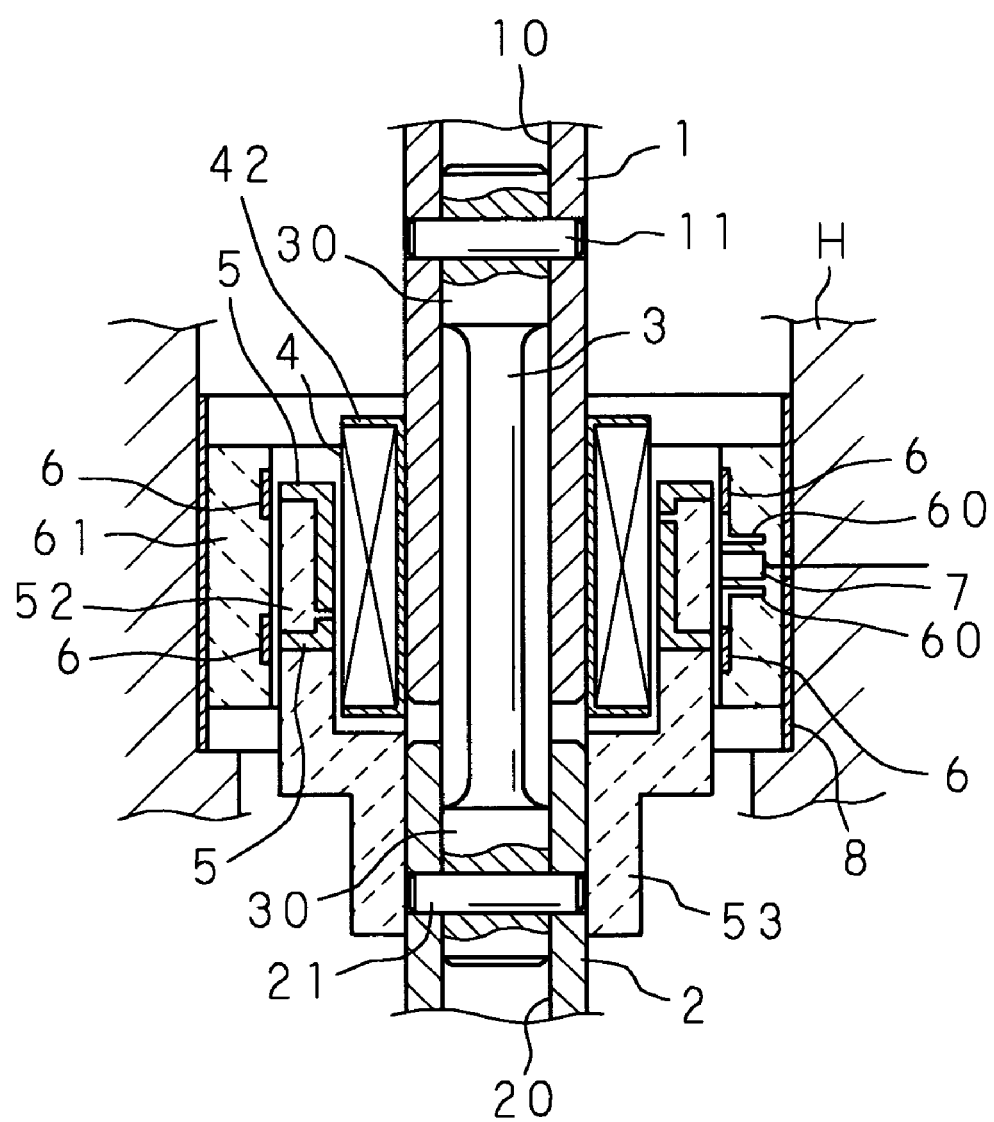
FIG. 3 is a vertical cross sectional view showing an assembled state of the torque detecting device of the present invention.

FIG. 2 is an exploded perspective view of a torque detecting device of the present invention, and FIG. 3 is a vertical cross sectional view showing an assembled state of the torque detecting device of the present invention.

The torque detecting device of the present invention aims to detect torque applied to two shafts (the first shaft 1 and second shaft 2) connected coaxially to each other through a torsion bar 3, and comprises a cylindrical magnet 4 which rotates together with the first shaft 1 and a pair of yoke rings 5 and 5 which rotate together with the second shaft 2. The torque detecting device also comprises magnetic flux collecting rings 6 and 6, which are placed closely to surround the outside of the yoke rings 5 and 5 separately, for collecting magnetic flux generated in the respective yoke rings 5 and 5, and two magnetic sensors 7 and 7 placed between the magnetic flux collecting rings 6 and 6 in the manner described later.

The torsion bar 3 comprises large-diameter short connection sections 30 and 30 at both ends of a small-diameter round bar functioning as a torsion spring to connect the first and second shafts 1 and 2. The connection of the first shaft 1 and the second shaft 2 with the torsion bar 3 is realized by inserting the connection sections 30 and 30 at both ends of the torsion bar 3 into connection holes 10 and 20 formed in the axial center of the respective shafts, performing positioning in the circumferential direction as to be described later, and then inserting separate connection pins 11 and 21 to integrate them. When rotational torque is applied to the first shaft 1 and second shaft 2 thus connected, the torsion bar 3 is torsionally deformed by the function of the rotational torque, and a relative angular displacement with a magnitude corresponding to the rotational torque is caused between the first shaft 1 and the second shaft 2.

As shown in FIG. 2, the cylindrical magnet 4 which rotates together with the first shaft 1 is constructed as a multi-polar magnet in which a plurality of magnetic poles (a plurality of N poles 40, 40 . . . and S poles 41, 41 . . . ) are aligned in the circumferential direction and the end faces and inner surface are covered with a mold member 42 made of a resin having an appropriate thickness, and, as shown in FIG. 3, the cylindrical magnet 4 is coaxially fitted and fixed on the first shaft 1 through the mold member 42.

As shown in FIG. 2, each of the yoke rings 5 and 5 which rotates together with the second shaft 2 is a ring made of magnetic material and comprising a plurality of pole claws 51, 51, . . . which extend in the axial direction and are arranged at equal intervals in the circumferential direction in the inner surface of a ring-shaped yoke body 50. Each of the pole claws 51, 51 . . . has a triangular shape narrowed toward the extending edge. The two yoke rings 5 and 5 are positioned by arranging protruding ends of their pole claws 51, 51 . . . to oppose each other and arranging their pole claws 51, 51 . . . alternately in the circumferential direction, and then the outside of these yoke rings 5 and 5 is covered with a mold member 52 made of a resin molded into a cylindrical shape to integrate these components.

The yoke rings 5 and 5 thus constructed are mounted by coaxially fitting and fixing them to the shaft end of the second shaft 2 through a boss section 53 formed by extending the mold member 52 to one side, so that their inner surfaces face the outer circumferential surface of the cylindrical magnet 4 fitted and fixed to the first shaft 1, with a slight air gap therebetween as shown in FIG. 3.

Figure 4:
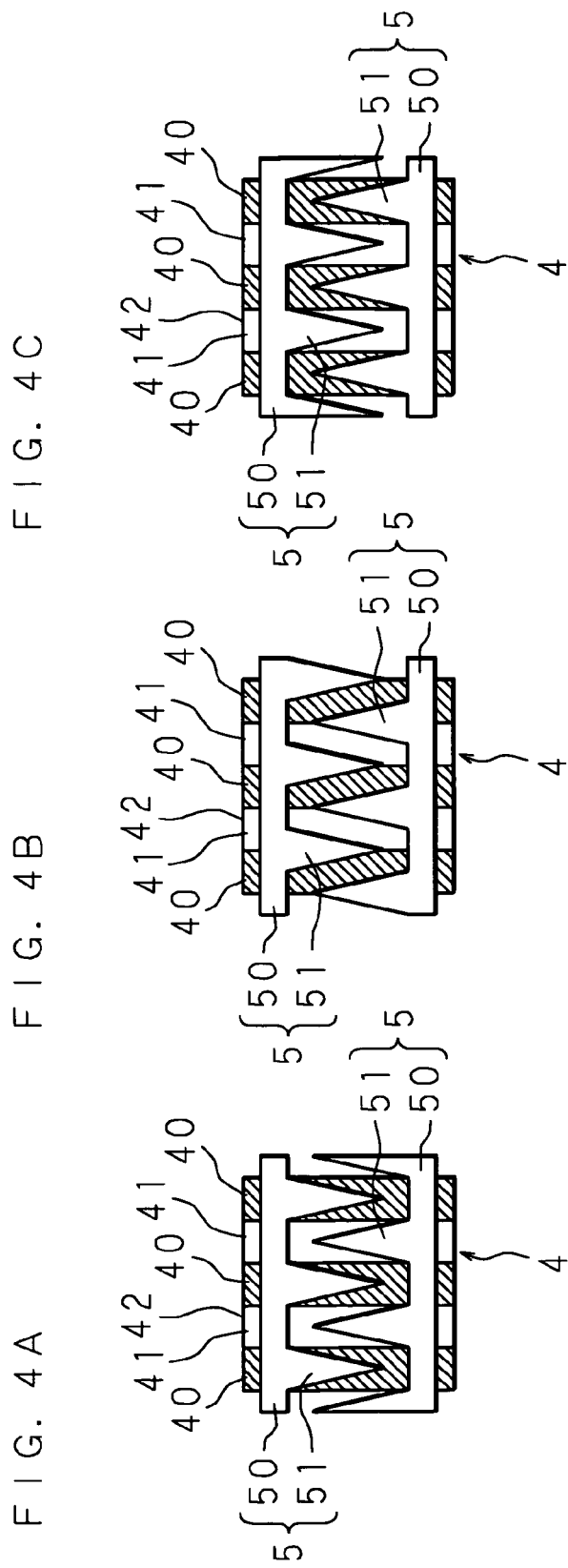
FIGS. 4A to 4C are explanatory views showing the positional relationship between the pole claws of yoke rings and the magnetic poles of a cylindrical magnet in the circumferential direction.

FIGS. 4A to 4C are explanatory views showing the positional relationship between the pole claws of the yoke rings and the magnetic poles of the cylindrical magnet in the circumferential direction. FIG. 4B shows the positional relationship at the time of mounting in which the yoke rings 5 and 5 and the cylindrical magnet 4 are positioned in the circumferential direction so that the pole claws 51, 51, . . . are aligned with the boundaries between the N poles 40 and S poles 41 arranged along the circumference of the cylindrical magnet 4 as shown in FIG. 4B. This positioning is realized by adjusting the circumferential positions of the cylindrical magnet 4 and yoke rings 5 and 5 as well as the two shafts 1 and 2 when connecting the first shaft 1 and second shaft 2 with the torsion bar 3.

In such a mounted state, the pole claws 51, 51, . . . of the two yoke rings 5 and 5 are positioned under the same conditions in a magnetic field formed between adjacent N pole 40 and S pole 41 on the circumference of the cylindrical magnet 4, and equal magnetic flux is produced in the yoke bodies 50 and 50 connecting the base sections of the pole claws 51, 51, . . . .

The positional relationships between such pole claws 51, 51 . . . and the N poles 40 and the S poles 41 are displaced in opposite directions as shown in FIG. 4A or FIG. 4C, according to the relative angular displacement caused with the torsion of the torsion bar 3 between the first shaft 1 to which the cylindrical magnet 4 is fixed and the second shaft 2 to which the yoke rings 5 and 5 are fixed. When this displacement occurs, lines of magnetic forces having mutually opposite polarities increase in the pole claws 51, 51 . . . of one yoke ring 5 and the pole claws 51, 51 . . . of the other yoke ring 5, and positive magnetic flux and negative magnetic flux are generated in the respective yoke bodies 50 and 50. The positive and negative of the magnetic flux generated at this time depends on the direction of the relative angular displacement caused between the cylindrical magnet 4 and the yoke rings 5 and 5, that is, between the first shaft 1 and the second shaft 2, and the density of positive or negative magnetic flux depends on the magnitude of the relative angular displacement.

The magnetic flux collecting rings 6 and 6 for collecting magnetic flux generated in the yoke rings 5 and 5 as described above are rings made of magnetic material having an inner diameter slightly larger than the outer diameter of each yoke body 50 and placed closely to face the outside of the yoke bodies 50 and 50 of the respective yoke rings 5 and 5. As shown in FIG. 2, the magnetic flux collecting rings 6 and 6 have magnetic flux collecting sections 60 and 60, which extend from the magnetic flux collecting rings in the axial direction and have ends bent outward at substantially right angles, at two corresponding positions in the circumferential direction.

These magnetic flux collecting rings 6 and 6 are positioned coaxially so that the extended sides of the magnetic flux collecting sections 60 and 60 face each other and the ends of the respective magnetic flux collecting sections 60 and 60 oppose each other with a predetermined air gap therebetween in the axial direction, and then integrated by covering the outside thereof with a mold member 61 made of a resin molded into a cylindrical shape. The magnetic sensors 7 composed of magnetic detection elements, such as the Hall elements, are placed in the air gap between the ends of the magnetic flux collecting sections 60 and 60 of the magnetic flux collecting rings 6 and 6 thus positioned.

Note that the magnetic flux collecting rings 6 and 6 have the magnetic flux collecting sections 60 and 60 at two positions in the circumferential direction, and, as shown in FIG. 2, two magnetic sensors 7 and 7 are placed in the air gap between the ends of the magnetic flux collecting sections 60 and 60 at two positions. The reason why two magnetic sensors 7 and 7 are provided is to use one magnetic sensor 7 for torque detection and the other for failure determination. The failure determination is performed by a publicly known procedure in which, for example, the outputs of the two magnetic sensors 7 and 7 are compared in time course and, when there is a clear difference between the outputs, the magnetic sensor 7 which shows an unsteady output change before or after this time is determined to be in a failed state.

Figure 5:
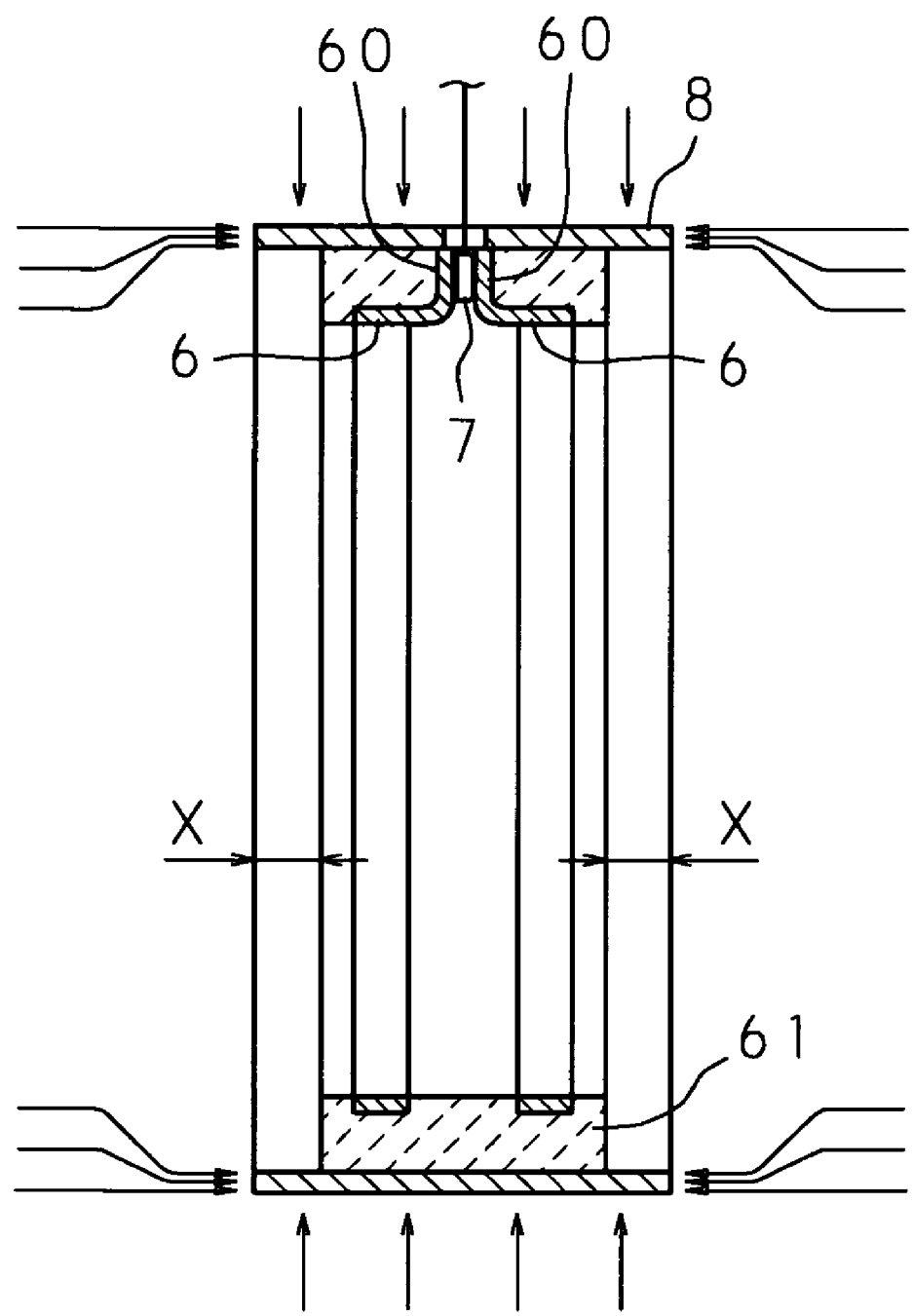
FIG. 5 is a cross sectional view showing the structure of a magnetic shield in the torque detecting device of the present invention.

Further, a magnetic shield 8 which is a characteristic feature of the present invention is wound on the outside of the mold member 61. FIG. 5 is a cross sectional view showing the structure of the magnetic shield in the torque detecting device of the present invention, and illustrates a magnetic flux collecting ring assembly comprising a pair of magnetic flux collecting rings 6 and 6 integrated with the mold member 61 as described above, and the magnetic sensors 7 and 7 placed between the magnetic flux collecting sections 60 and 60.

The magnetic shield 8 is a cylindrical member made of a thin plate of magnetic material and mounted to cover entirely the outside of the mold member 61. The magnetic shield 8 has a length appropriately longer than the mold member 61 and is mounted so that, as shown in FIG. 5, there are extended sections with a predetermined length on both sides of the mold member 61 in the axial direction.

Figure 6:
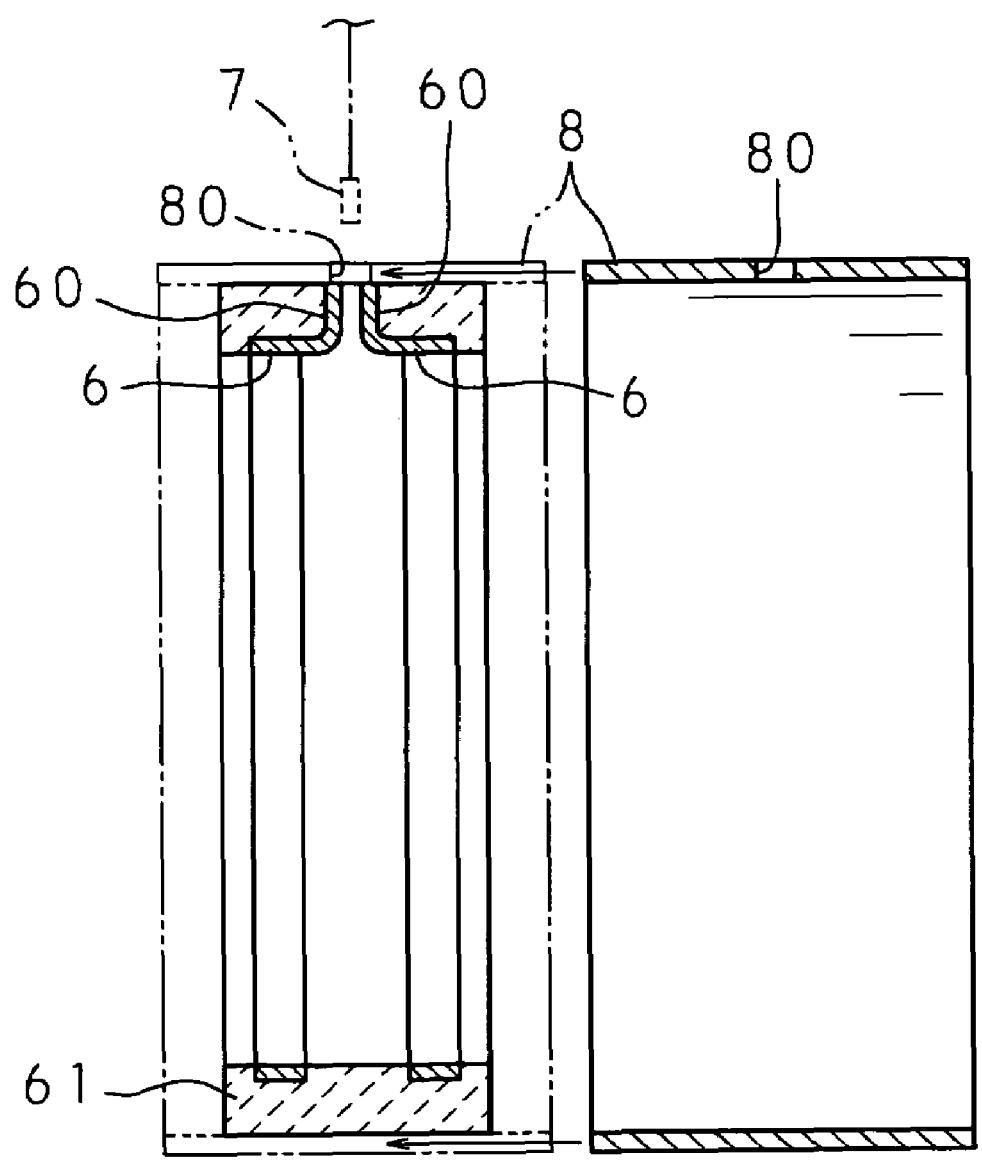
FIG. 6 is an explanatory view showing the procedure of mounting the magnetic shield shown in FIG. 5.

FIG. 6 is an explanatory view showing the procedure of mounting the magnetic shield 8. As shown in FIG. 6, it is possible to mount the magnetic shield 8 by shaping it into a cylinder in advance, positioning it coaxially on one side of the mold member 61 and fitting it over the mold member 61 as shown by the arrows in FIG. 6. In the circumferential surface of the magnetic shield 8, a window hole 80 is formed at a substantially center in the axial direction. As shown by the alternately long- and short-dashed line in FIG. 6, the window hole 80 is positioned between the opposing surfaces of the magnetic flux collecting sections 60 and 60 by fitting the magnetic shield 8 over the mold member 61, and used as an insertion hole for the magnetic sensor 7 which is to be placed between the opposing surfaces.

Mounting of such a magnetic shield 8 is easily realized by simple fitting. Moreover, the magnetic shield 8 as a simple cylindrical member can be easily formed by shaping a belt-like plate, or by using a tube material with an appropriate diameter. Thus, it is possible to easily mount the magnetic shield 8 without requiring a large number of steps.

Further, the magnetic shield 8 may also be mounted by procedures other than the above-mentioned procedure, for example, by a procedure in which the magnetic shield 8 is positioned together with the magnetic flux collecting rings 6 and 6 in a mold for molding the mold member 61 and integrated while maintaining a predetermined positional relationship with the magnetic flux collecting rings 6 and 6. In this case, needless to say, it is also possible to easily mount the magnetic shield 8 without requiring a large number of steps.

Figure 1:
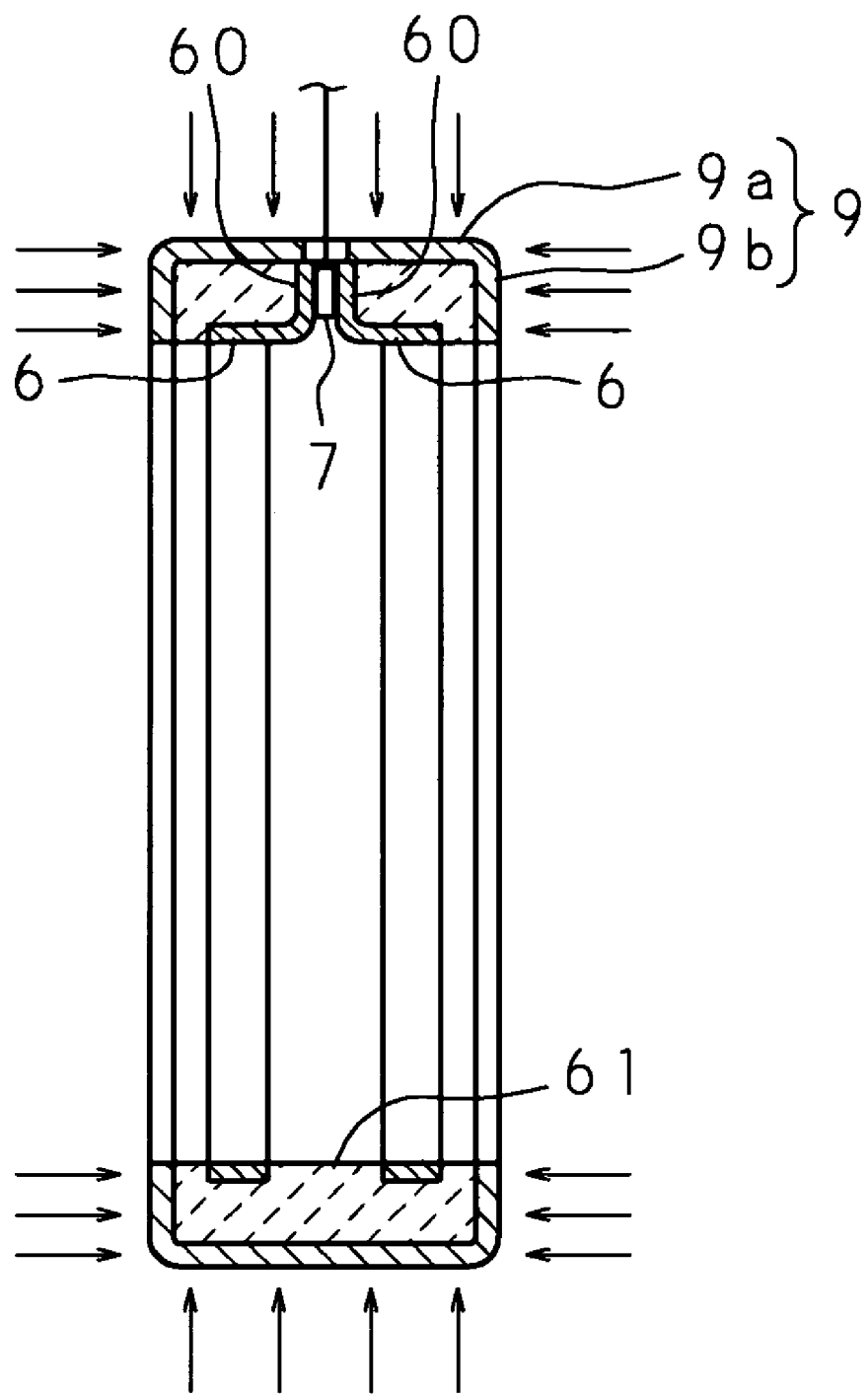
FIG. 1 is a cross sectional view showing the structure of a conventional magnetic shield.

The magnetic shield 8 mounted by the above-mentioned procedure performs the function of shielding magnetic noise from various directions and eliminating the influence on the magnetic flux collecting rings 6 and 6 in a later-described use condition. Here, magnetic noise from outside in the radius direction is directly shielded by the magnetic shield 8 covering the outer surface of the mold member 61 entirely like a conventional magnetic shield 9 shown in FIG. 1, but, unlike the conventional magnetic shield 9, magnetic noise from both sides in the axial direction is shielded by concentrating the magnetic noise on the end faces of the magnetic shield 8 made of magnetic material as shown by the arrows in FIG. 5.

Such concentration is effectively realized because the end faces of the magnetic shield 8 are extended from both sides of the mold member 61. In order to enhance the shield effect, the length X of the extended sections (see FIG. 5) is preferably made as long as possible within the limit of the length of the magnetic flux collecting ring assembly in the axial direction.

The magnetic flux collecting ring assembly with the magnetic shield 8 thus mounted is fitted into a housing H shown in part in FIG. 3 and fixed at a position so that the inner circumferential surfaces of the magnetic flux collecting rings 6 and 6 exposed to the inner surface of the mold member 61 closely face the outer circumferential surfaces of the yoke bodies 50 and 50 of the respective yoke rings 5 and 5. Hence, the magnetic flux generated in the yoke bodies 50 and 50 placed close to the inner sides of the respective magnetic flux collecting rings 6 and 6 is guided to the magnetic flux collecting rings 6 and 6, converged onto the respective magnetic flux collecting sections 60 and 60, and leaks into the air gap secured between the magnetic flux collecting sections 60 and 60, and then the magnetic sensors 7 and 7 placed in the air gap give outputs corresponding to the density of the leakage magnetic flux.

The magnetic flux density thus detected as the outputs of the magnetic sensors 7 and 7 changes depending on the magnetic flux generated in the yoke bodies 50 and 50 facing the magnetic flux collecting rings 6 and 6. Since the generated magnetic flux corresponds to the relative angular displacement with respect to the cylindrical magnet 4 as described above, that is, the relative angular displacement between the first shaft 1 and second shaft 2, the outputs of the magnetic sensors 7 and 7 correspond to the direction and magnitude of rotational torque which is applied to the first shaft 1 and second shaft 2 and causes the relative angular displacement, and thus it is possible to detect the rotational torque applied to the first shaft 1 and second shaft 2, based on a change in the outputs of the magnetic sensors 7 and 7.

The outputs of the magnetic sensors 7 and 7 may possibly contain errors due to the influence of magnetic noise generated in the periphery of the mount position. However, in the torque detecting device of the present invention, since the magnetic shield 8 surrounding the outside of the magnetic flux collecting rings 6 and 6 performs the function of shielding magnetic noise as described above, it is possible to reduce the influence of magnetic noise on the outputs of the magnetic sensors 7 and 7, and it is possible to realize highly accurate detection of rotational torque based on the outputs.

In the torque detecting device of the present invention, the magnetic shield 8 for shielding magnetic noise in such a manner has a simple cylindrical shape and is easily mounted by the above-mentioned procedure, and thus it is possible to highly accurately detect the torque without increasing the product cost due to an increase in the number of assembly steps.

Therefore, the torque detecting device of the present invention is suitably used as a torque detecting device capable of achieving high detection accuracy in an environment including a lot of magnetic noise and capable of being constructed at low costs, such as a torque detecting device for detecting steering torque applied to a steering member for use in the drive control of a steering assist motor in an electric power steering apparatus.

The invention claimed is:

1. A torque detecting device comprising:
   a cylindrical magnet rotating together with one of a first shaft and a second shaft which are coaxially connected to each other;
   a pair of yoke rings rotating together with the other one of the first shaft and second shaft within a magnetic field formed by said cylindrical magnet;
   a pair of magnetic flux collecting rings surrounding the outside of said yoke rings respectively;
   a magnetic sensor placed between opposing surfaces of magnetic flux collecting sections provided on the respective magnetic flux collecting rings; and
   a magnetic shield for covering the outside of a mold member holding said magnetic flux collecting rings integrally, said magnetic shield being made of magnetic material and having sections extending in an axial direction away from both sides of said mold member,
   wherein said torque detecting device detects torque applied to said first shaft and second shaft based on leakage magnetic flux between said magnetic flux collecting sections which is detected by said magnetic sensor.

2. The torque detecting device according to claim 1, wherein said mold member and said magnetic shield are cylindrical members, and said magnetic shield is externally fitted and fixed on said mold member.

3. The torque detecting device according to claim 1, wherein said magnetic shield has a window hole, at a substantially center in the axial direction, for inserting said magnetic sensor between the opposing surfaces of said magnetic flux collecting sections.

4. The torque detecting device according to claim 1, wherein the inside of said magnetic flux collecting rings is exposed from the mold member.

5. The torque detecting device according to claim 1, wherein a length of the magnetic shield in the axial direction is longer than a length of the mold member in the axial direction.

6. The torque detecting device according to claim 5, wherein the magnetic shield is not overlapped with the mold member in the axial direction.

* * * * *